United States Patent [19]

Shibaya

[11] Patent Number: 5,301,932

[45] Date of Patent: Apr. 12, 1994

[54] VEHICULAR STRUT TYPE SUSPENSION

[75] Inventor: Takao Shibaya, Hamamatsu, Japan

[73] Assignee: Suzuki Motore Corp., Shizuoka, Japan

[21] Appl. No.: 863,339

[22] Filed: Apr. 2, 1992

Related U.S. Application Data

[63] Continuation-in-part of Ser. No. 613,937, Oct. 26, 1990, abandoned, which is a continuation of Ser. No. 333,692, Apr. 4, 1989, abandoned.

[30] Foreign Application Priority Data

Jul. 15, 1988 [JP] Japan .............................. 63-176491

[51] Int. Cl.$^5$ ............................................ B60G 15/00
[52] U.S. Cl. .................................... 267/221; 280/668
[58] Field of Search ................. 188/17, 18 A, 71.1; 280/96.1, 96.3, 666, 668, 670, 673, 675, 696, 710; 267/221, 222

[56] References Cited

U.S. PATENT DOCUMENTS

| | | | |
|---|---|---|---|
| 2,752,112 | 6/1956 | Payne, Jr. .................... | 280/963 X |
| 3,193,303 | 7/1965 | Allison et al. ................ | 267/222 X |
| 3,758,129 | 9/1973 | Ishikawa et al. ............. | 280/96.1 |
| 4,159,125 | 6/1979 | Buchwald ..................... | 267/221 X |
| 4,202,560 | 5/1980 | Inbody ......................... | 280/96.3 |
| 4,341,396 | 7/1982 | Decouzon et al. ........... | 280/666 |
| 4,620,720 | 11/1986 | Sakata et al. ................ | 280/666 |
| 4,653,772 | 3/1987 | Sautter ......................... | 280/696 X |
| 4,674,760 | 6/1987 | Goulart ........................ | 280/96.1 X |
| 4,703,947 | 11/1987 | Tattermusch et al. ....... | 280/700 X |
| 4,930,805 | 6/1990 | Takata et al. ................ | 280/701 X |

FOREIGN PATENT DOCUMENTS 58-20506  2/1983  Japan .................................. 280/668

*Primary Examiner*—Robert J. Oberleitner
*Assistant Examiner*—Chris Schwartz
*Attorney, Agent, or Firm*—McGlew and Tuttle

[57] ABSTRACT

A Macpherson strut type suspension including a vehicular disc brake, wherein a strut and a coil spring are disposed at offset positions from the axis of a spindle as viewed in the direction of movement of an automotive vehicle so that a space required for installing a disc brake actuator is provided in a region in the proximity of the uppermost end of the a disc rotor in which a disc brake actuator is installed. This allows the disc actuator to be installed at the highest position above the ground without any interference with the strut and the coil spring. Further, the coil spring can be disposed in the proximity of a wheel.

8 Claims, 6 Drawing Sheets

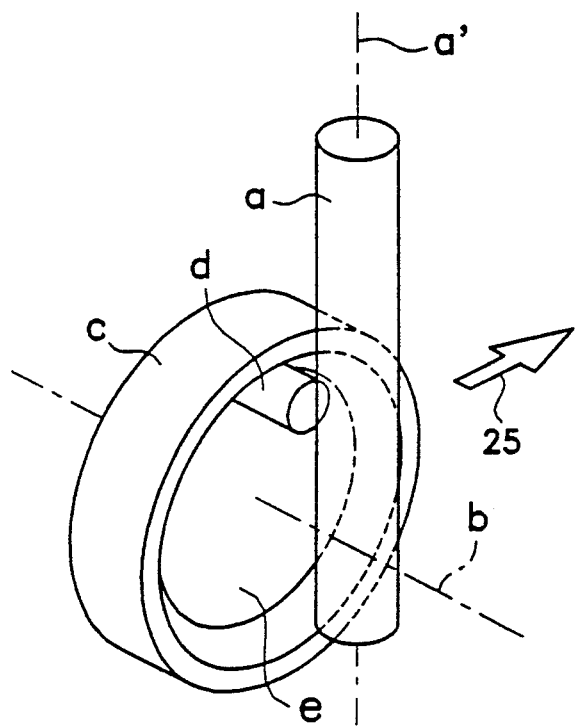
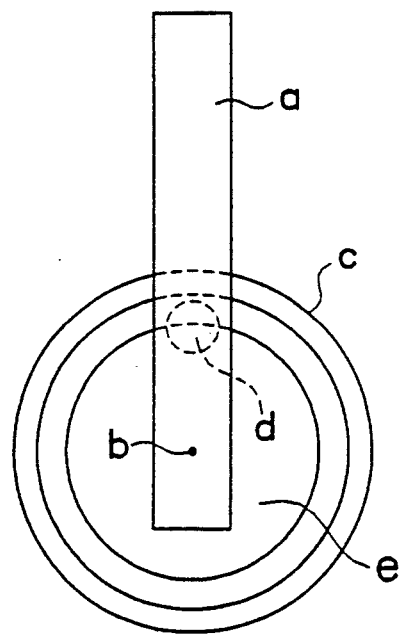
Fig. 6a (PRIOR ART)
Fig. 6b (PRIOR ART)
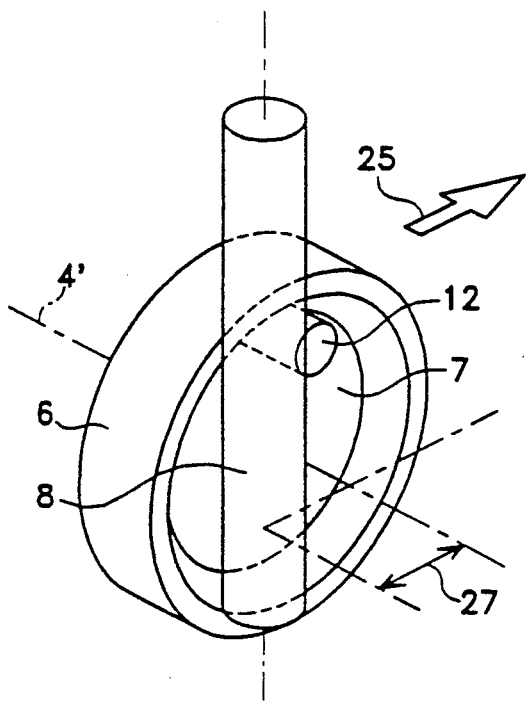
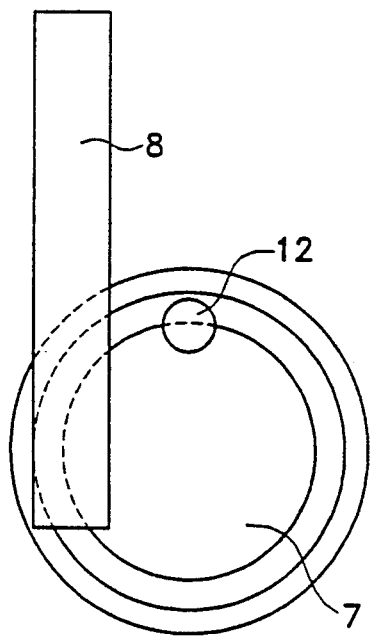
Fig. 7a
Fig. 7b

VEHICULAR STRUT TYPE SUSPENSION

CROSS REFERENCE TO RELATED APPLICATIONS

This application is a continuation-in-part of application Ser. No. 07/613,937 filed on Oct. 26, 1990 which is a continuation of application Ser. No. 07/333,692 filed on Apr. 4, 1989; both abandoned.

FIELD OF THE INVENTION

The present invention relates to a vehicular strut type suspension and more particularly to a vehicular strut type suspension including a disc brake, wherein a disc brake actuator is disposed in the optimum manner.

BACKGROUND OF THE INVENTION

A conventional strut type suspension is typically constructed in the following manner.

As schematically illustrated in a top view, as shown in FIG. 3, the conventional strut type suspension is so constructed that a strut a is held on the axis b of a spindle at a position in the vicinity of a wheel c.

When a disc brake is employed for such a suspension as described above, a disc brake actuator d should be installed at a position located away from the strut a, i.e., at a position offset from the uppermost end part of a disc rotor e in the forward or rearward direction. This causes the disc brake actuator d to be situated at a lower position as measured from the ground surface. Consequently, the disc brake actuator d is liable to be damaged or injured by flying pebbles or like foreign matter.

With respect to the conventional suspension including a coil spring f which is disposed separately from the strut a as shown in FIG. 3, the coil spring f, should be situated at a position offset possibly near to the central part of a vehicular body g in order to avoid an occurrence of interference with the disc brake actuator d. Arrangement of the coil spring f away from the wheel c in that way leads to a result that a magnitude of load exerted on bushes i required for holding the pivotal shaft for a control arm h is increased as the coil spring f is located more and more remote from the wheel c. Accordingly, employment of the foregoing arrangement is not preferable.

SUMMARY AND OBJECTS OF THE INVENTION

The present invention has been made with the foregoing background in mind and the object of the present invention resides in providing a vehicular strut type suspension, particularly for a non-driven wheel, which assures that damage or injury of a disc brake actuator caused by flying pebbles or like foreign matter is prevented as far as possible without any use of protecting means such as a cover or like means.

The vehicular strut type suspension of the present invention has a control arm which is pivotably attached to the vehicle by bushing means. The control arm pivots in a substantially vertical plane. A spindle is rigidly connected to the control arm and a longitudinal axis of the spindle defines a spindle axis. A hub is rotatably mounted on the spindle by a bearing means. The hub rotates about the spindle axis. On the hub a disc rotor is rigidly connected and rotates with the hub. A non-driven wheel is rigidly connected to the disc rotor and hub and rotates with the disc rotor and hub about the spindle axis in response to movement of the vehicle. A disc brake actuator is positioned at a substantially top most portion of said disc rotor in order to apply braking force to the non-driven wheel and to place it out of harms way due to flying pebbles or like foreign matter. On the control arm, a knuckle is rigidly connected and extends away from the control arm in a substantially horizontal plane. On an end of the knuckle away from the control arm, a strut is connected. The lower end of the strut is connected to the knuckle and the rest of the strut extends substantially directly vertically upward. The lower end of the strut connected to the knuckle is spaced by a distance away from the spindle axis. An upper part of the strut is connected to the vehicle at a point substantially directly above the lower end of the strut or the end of the knuckle. The upper part is also spaced from the spindle axis, in a direction of movement of the vehicle, by an amount substantially equal in magnitude and direction to the distance of the lower end of the strut or knuckle from the spindle axis. A coil spring has a lower end connected to the control arm at a location spaced a distance away from said spindle axis in the direction of movement of the vehicle. The location of the lower end of the coil spring being on an opposite side of the spindle axis from the strut. The coil spring extends substantially directly vertically upward and an upper end of the coil spring is connected to the vehicle at a point substantially directly above the lower end of the coil spring. The point of connection between the upper part of the coil spring and the vehicle body is spaced from the spindle axis in the direction of movement of the vehicle by an amount substantially equal in magnitude and direction to the amount of the spacing of the lower end of the coil spring from the spindle axis. The upper and lower ends of the strut and the coil spring are located substantially symmetrically about the spindle axis in a direction of movement of the vehicle. The strut and the coil spring are spaced apart by a distance in the direction of movement of the vehicle substantially equal to the size of the disc brake applicator and in an area adjacent to the disc brake applicator.

Another object of the present invention is to provide a vehicular strut type suspension, for a non-driven wheel, including a coil spring which is disposed at a separate position from a strut, wherein the coil spring is disposed at the side part of a vehicular body as far as possible so that a magnitude of load exerted on bearings for a control arm is reduced.

To accomplish the above objects, the present invention provides a vehicular strut type suspension including a disc brake, wherein a strut and a coil spring are disposed at positions offset from the axis of a spindle as viewed in the direction of movement of an automotive vehicle so that a space required for installing a disc brake actuator is provided in a region in the proximity of the uppermost end part of the disc rotor in which a disc brake actuator is disposed.

According to the present invention, since the disc brake actuator is installed at a position located most remote from the ground surface, damage or injury of the disc brake actuator caused by flying pebbles or like foreign matter can be prevented as far as possible. Further, since there is no fear that the coil spring is interfered with by the disc brake, and because the coil spring is disposed at a separate position from the strut, the coil spring can be situated possibly near to a wheel. This enables a magnitude of load exerted on bearings for the control arm to be reduced remarkably.

These and other objects, features and advantages of the present invention will become more readily apparent from a reading of the following description which has been made with reference to the accompanying drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The present invention will be illustrated in the following drawings in which:

FIGS. 6a and 6b are perspective views of a schematic representation of a conventional strut type suspension; and FIGS. 7a and 7b are perspective views of a schematic representation of the strut type suspension of the present invention.

DETAILED DESCRIPTION OF THE PREFERRED EMBODIMENT

Now, the present invention will be described in greater detail hereinafter with reference to the accompanying drawings which illustrate a preferred embodiment thereof.

Figure 1:
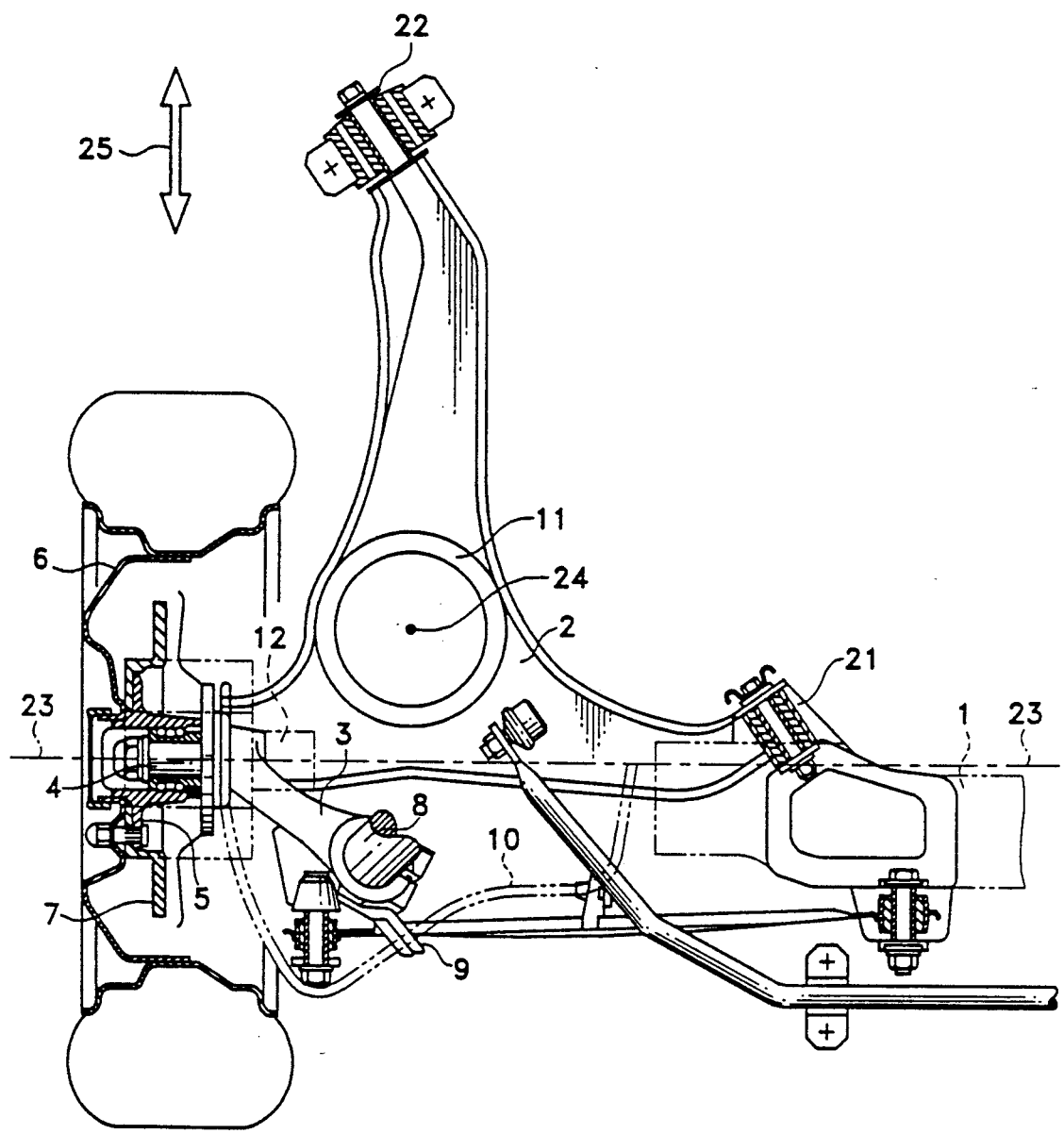
FIG. 1 is a fragmental sectional plan view illustrating a vehicular strut type suspension in accordance with a preferred embodiment of the present invention.
Figure 2:
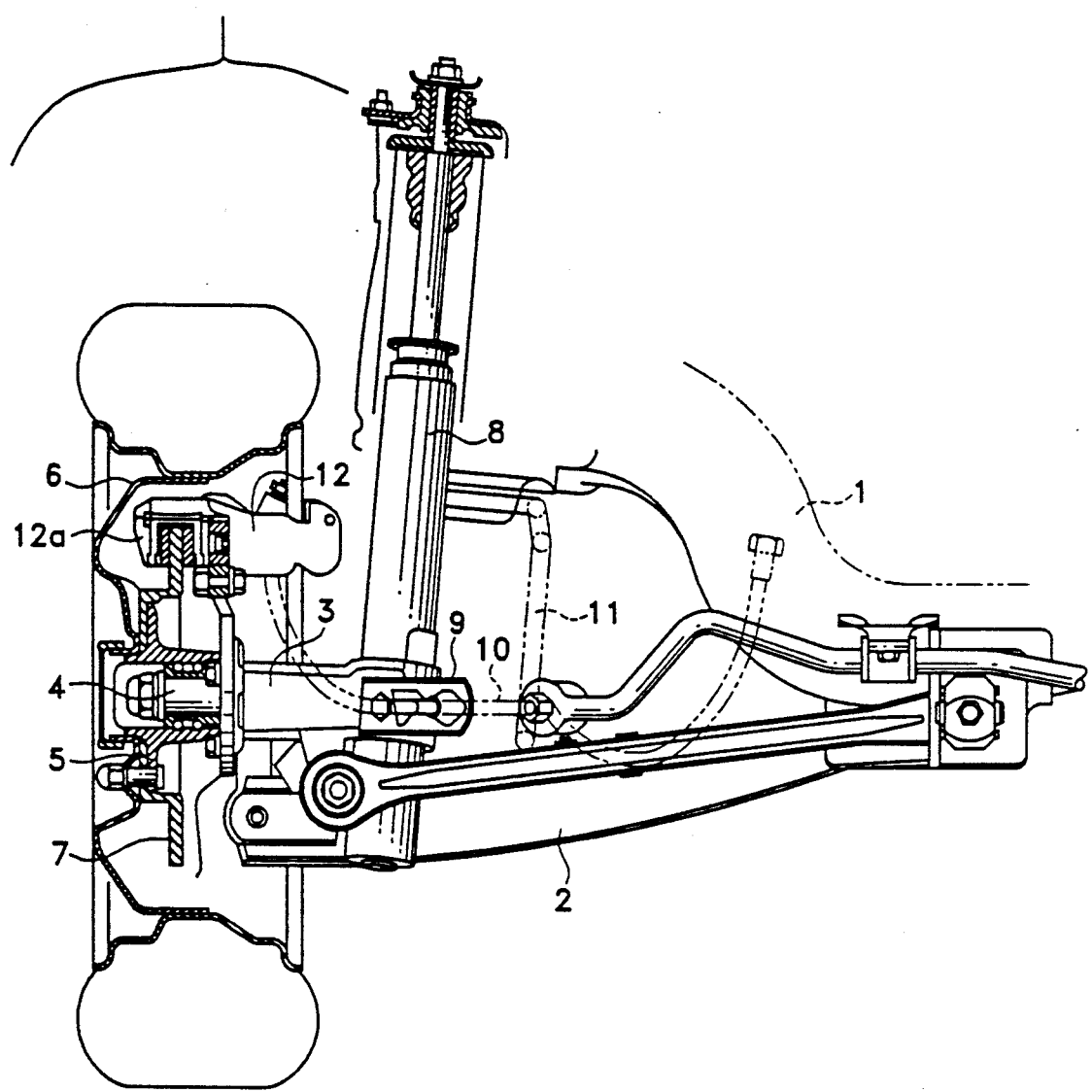
FIG. 2 is a fragmental front view of the strut type suspension in FIG. 1.
Figure 3:
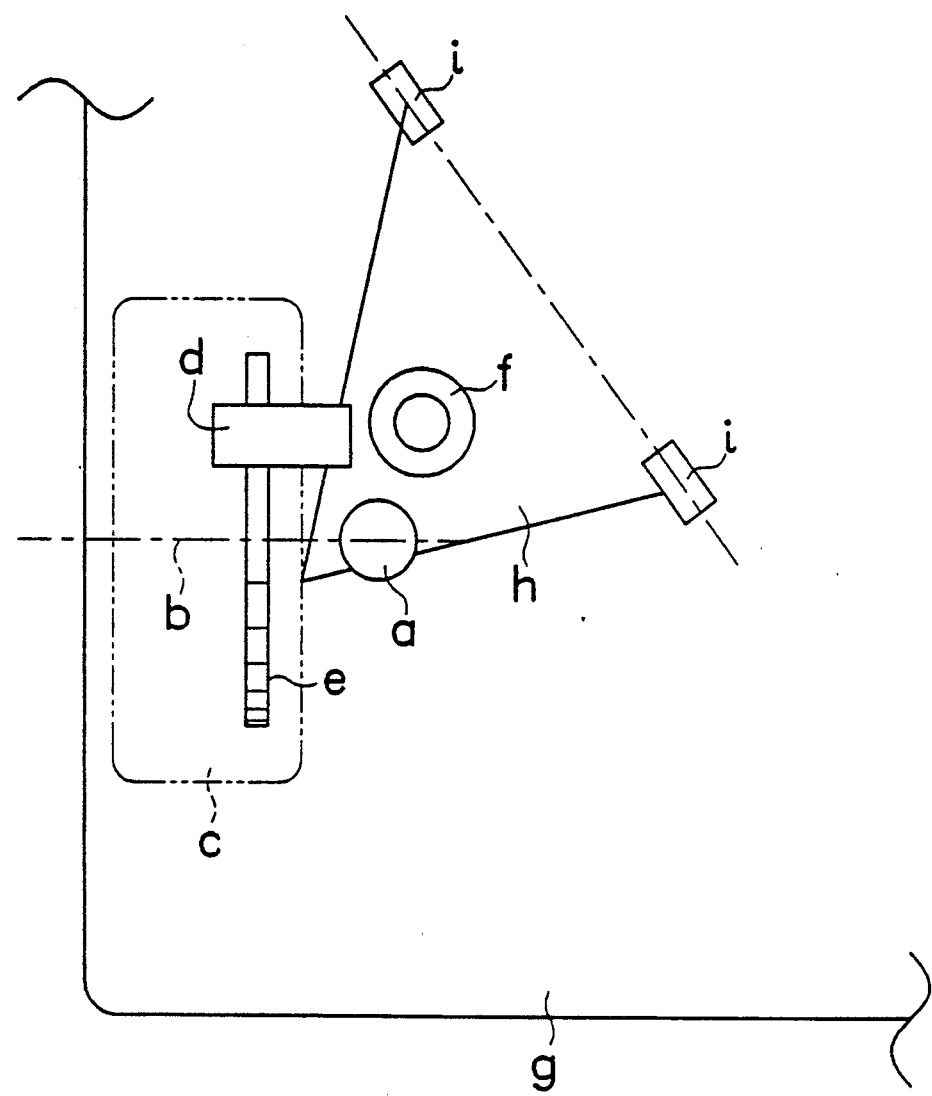
FIG. 3 is a plan view schematically illustrating the arrangement of essential components constituting a conventional strut type suspension.
Figure 4:
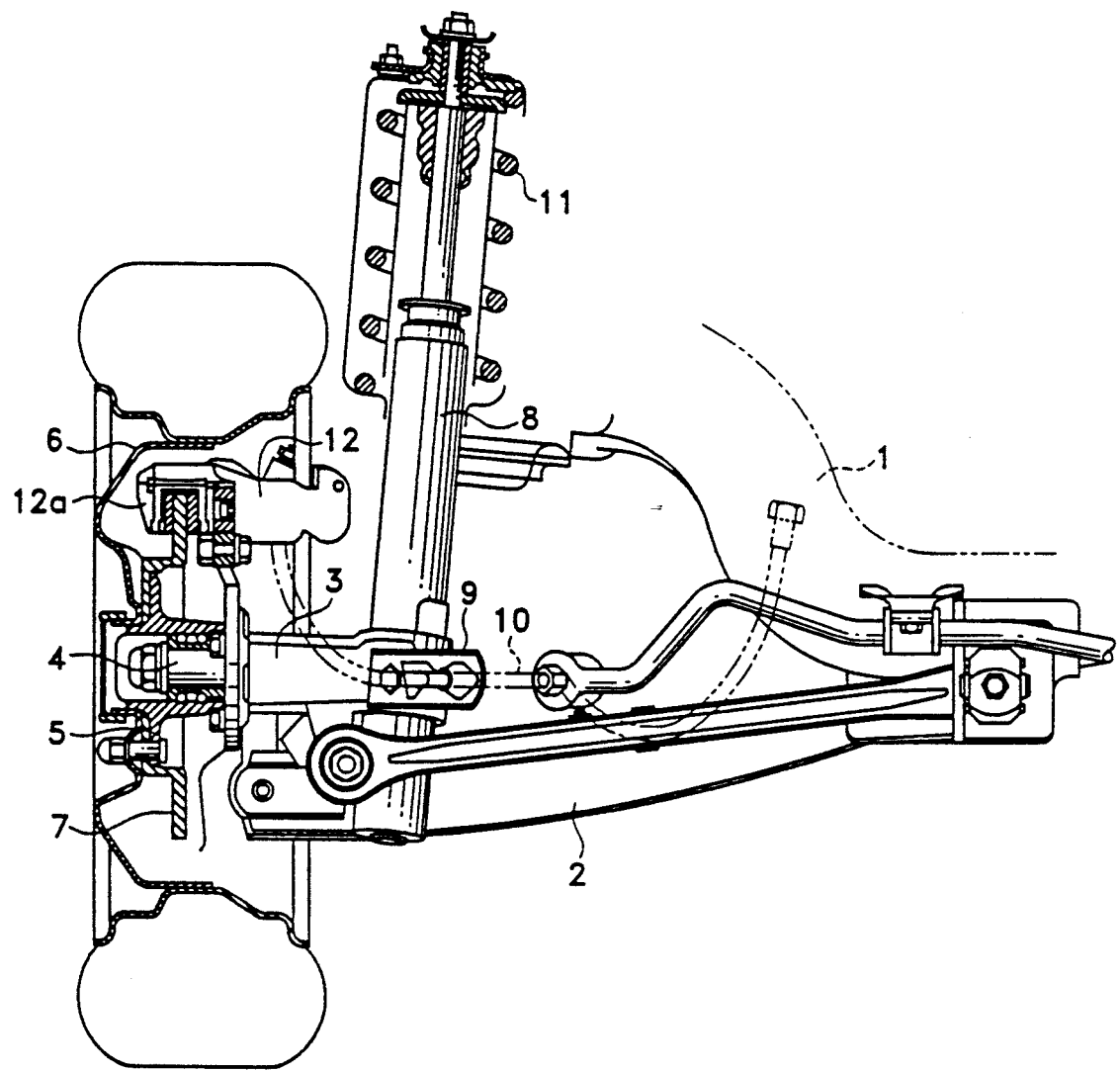
FIG. 4 is a front view of the strut type suspension in another embodiment.
Figure 5:
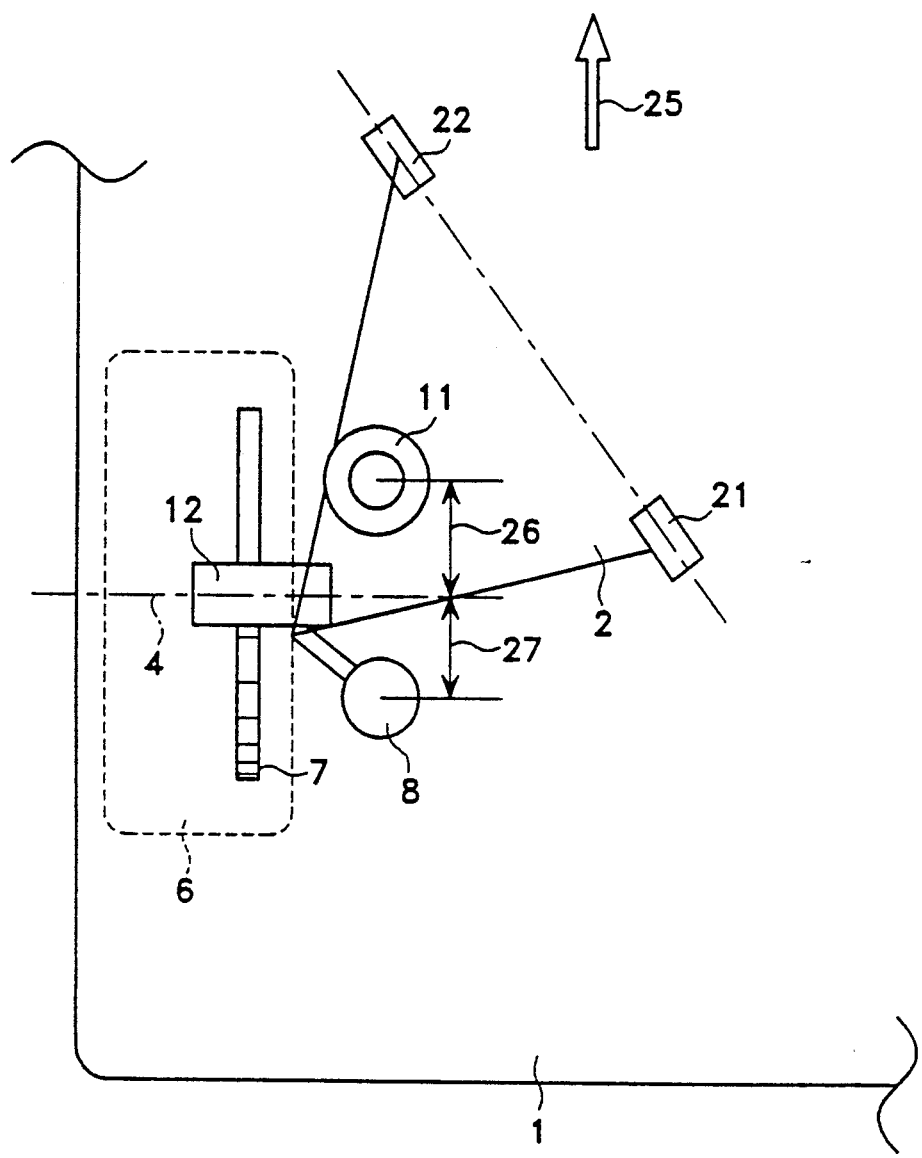
FIG. 5 is a schematic top view of the vehicular strut type suspension of the present invention.

FIGS. 1 and 2 illustrate a strut type rear suspension in accordance with an embodiment of the present invention. This suspension includes a cross member 1 which is rigidly attached to the vehicle. A lower control arm 2 is supported turnably, in a substantially vertical plane, to the vehicle by a bushing means 21 connected between the lower control arm 2 and the cross member 1, and by another bushing means 22 connected between the lower control arm 2 and another point on the vehicle. The lower control arm 2 includes a knuckle 3 extending away from the lower control arm 2. The knuckle 3 and lower control arm 2 are rigidly connected with a spindle 4. The spindle 4 has a spindle axis 23 coaxial with the spindle 4. At one end of on the spindle 4 a hub 5 is mounted. A disc rotor 7 is interposed between the hub 5 and a non-driven wheel 6 in a clamped state. The non-driven wheel 6 is not driven by the spindle 4 or any other rotating means in direct connection to the wheel (The term non-driven wheel is used to refer to a passive wheel such as rear wheel in a front wheel drive vehicle, moving in response to vehicle movement). The hub 5, disc rotor 7 and non-driven wheel 6 rotate around the spindle 4 and about the spindle axis 23 by bearing means. This rotating is caused by movement of the vehicle.

As is apparent from FIG. 1, the knuckle 3 extends in a substantially horizontal plane similar to a horizontal plane containing the spindle 4. The knuckle 3 extends slantwise, away from the spindle axis 23 by a distance 27, toward a rearward and interior direction of the vehicle. A lower part of a strut 8 is connected at an extended end of the knuckle 3 opposite the lower control arm 2. The strut 8 extends substantially directly vertically upwards from the knuckle 3. An upper part of the strut 8 has means for connecting to the vehicle. In addition, a bracket 9 is provided at the extended end of the knuckle 3 so that a brake hose 10 is held by the bracket 9. A coil spring 11 is interposed on an opposite side of the spindle axis from the strut, and between the control arm 2 and the cross member 1 which rises up vertically as it nears the wheel 6. The coil spring 11 has a substantially vertical coil axis 24 which is coaxial to a longitudinal axis of the coil spring 11. The coil axis 24 is substantially perpendicular to the spindle axis 23 and a lower end of the coil spring 24 is spaced from the spindle axis 23 by a distance 26 along the vehicle movement direction 25. The upper end of the coil spring 11 is substantially directly above the lower end of the coil spring 11 also has means for connecting to the vehicle at a point. This point substantially is also spaced from the spindle axis 23 by substantially the distance 26 along the vehicle movement direction 25. The coil spring 11 is preferably provided at a position located in a substantially symmetrical relationship relative to the strut 8 with the axis of the spindle 4 interposed there between.

The upper parts of both the coil spring 11 and the strut 8 being spaced apart by a distance substantially equal to a distance spacing apart the lower parts of both the coil spring 11 and the strut 8.

A disc brake actuator 12 is disposed in a space horizontally defined in the direction of vehicle movement, by the area between the spring 11 and the strut 8. This space being located above the spindle 4. Further, a caliper portion 12a of the disc brake actuator 12 is situated at the uppermost position of the disc rotor 7 and at an interior side of the wheel 6. The coil spring 11 and the strut 8 being spaced far enough apart and away from the spindle axis 23, and extending substantially vertically, to define the space between the coil spring 11 and the strut 8, to be sufficiently large to allow passage of the disc brake actuator 12 during installation and removal of the disc brake actuator 12.

The present invention has been described above as to the case where it is applied to a rear suspension. However, it should of course be understood that it may be applied to a front suspension in the same way as the rear suspension.

Further, the present invention has been described by way of example with respect to a semi-trailing type suspension. Alternatively, it may be likewise applied to other type of swing arm suspension such as a full-trailing type suspension or the like.

Moreover, the present invention has been described by way of example as to the case where the coil spring 11 is provided at a separate position from the strut 8. Alternatively, it may be likewise applied to a case where the coil spring 11 is assembled integral with the strut 8.

While specific embodiments of the invention have been shown and described in detail to illustrate the application of the principles of the invention, it will be understood that the invention may be embodied otherwise without departing from such principles.

What is claimed is:

1. A vehicular strut type suspension, comprising:
a wheel;
a non driven vehicle wheel spindle having a spindle axis;
a knuckle connected to said spindle at one end and having another end, said knuckle extending at an angle with respect to said spindle axis, said another end of said knuckle being positioned rearwardly of said spindle axis and inwardly from said wheel;
a hub supported by said spindle;
a disk brake assembly supported by said hub including a disk brake rotor mounted with respect to said spindle, inwardly of said wheel, and a disk brake actuator also disposed inwardly of said wheel on an upper most end of said disk rotor;
a strut connected to said another end of said knuckle;
a coil spring disposed at an opposite side of said spindle axis from said strut, said coil spring being disposed at an offset position from said spindle axis and extending substantially vertically, said substantially vertically extending strut and said substantially vertically extending coil defining an access region between said strut and said coil, substantially equal to a width of the disc brake actuator said access region being located directly adjacent said upper most end part of said disk rotor on said inward side of said wheel.

2. A vehicular strut-type suspension in accordance with claim 1, further comprising:
a control arm connected to said spindle, said control arm including first bushing means for pivotably attaching a first point of said control arm to a first point of a vehicle, said control arm including second bushing means for pivotably attaching a second point of said control arm to a second point of the vehicle.

3. A vehicular strut-type suspension in accordance with claim 2, wherein:
said first and second bushing means are angularly spaced from each other with respect to said spindle.

4. A vehicular strut-type suspension in accordance with claim 2, wherein:
said first and second bushing means are positioned in a line extending obliquely to the direction of motion of the vehicle.

5. The vehicular strut type suspension as claimed in claim 1, further comprising: an additional spring assembled integral with said strut.

6. A vehicular strut-type suspension comprising:
a control arm having a first bushing means for pivotably attaching one point of the control arm to a cross member of a vehicle and also having a second bushing means for attaching another point of said control arm to a different point of the vehicle, said control arm pivoting in a substantially vertical plane;
a spindle rigidly connected to said control arm, said spindle having a spindle axis;
a hub having bearing means for rotatably mounting said hub on said spindle, said hub rotating about said spindle axis;
a disc rotor rigidly connected to said hub and rotating with said hub;
a disc brake actuator positioned at a substantially topmost portion of said disc rotor;
a non-driven wheel rigidly connected to said disc rotor and said hub, said non-driven wheel rotating with said disc rotor and said hub, said non-driven wheel, said disc rotor and said hub rotating in response to a vehicle movement;
a knuckle rigidly connected on one end to said control arm and said spindle, said knuckle obliquely extending away from said control arm and said spindle axis in a substantially horizontal plane, said knuckle terminating in another end, said another end of said knuckle being rearwardly spaced from said spindle axis along a direction of vehicle movement;
a strut having a lower end and an upper end, said lower end of said strut being offset over an oblique rear side of the vehicle and connected to said another end of said knuckle, said strut extending substantially directly vertically upward, said upper part of said strut having means for connecting said upper part of said strut to the vehicle at a point substantially directly above said another end of said knuckle, said upper part of said strut being spaced from said spindle axis in said direction of movement of the vehicle an amount substantially equal in magnitude and direction to an amount of said spacing of said another end of said knuckle from said spindle axis; and
a coil spring having a lower end and upper end, said lower end of said coil spring being connected to said control arm at a location spaced from said spindle axis, said location of said lower end of said coil spring being on an opposite side of said spindle axis from said strut, said coil spring extending substantially directly vertically upward, said upper end of said coil spring having means for connecting said upper part of said coil spring to the vehicle at a point substantially directly above said lower end of said coil spring, and said point of connection between said upper part of said coil spring and the vehicle being spaced from said spindle axis in said direction of movement of the vehicle by an amount substantially equal in magnitude and direction to an amount of said spacing of said lower end of said coil spring from said spindle axis, said upper and lower ends of said strut and said coil spring being located substantially symmetrically about said spindle axis in said direction of movement of the vehicle, said strut and said coil spring spaced apart a distance, in said direction of movement of the vehicle, substantially equal to said disc brake applicator and in an area adjacent said disc brake applicator.

7. A vehicular strut-type suspension in accordance with claim 6, wherein:
said first and second bushing means are angularly spaced from each other with respect to said spindle.

8. A vehicular strut-type suspension in accordance with claim 6, wherein:
said first and second bushing means are positioned in a line extending obliquely to the direction of motion of the vehicle.

* * * * *